United States Patent
Gutbrod

(10) Patent No.: US 12,427,988 B2
(45) Date of Patent: Sep. 30, 2025

(54) METHOD FOR OPERATING A LANE-CHANGE ASSISTANCE SYSTEM OF A VEHICLE, WITH SPEED-DEPENDENT DIFFERENTIATION OF A SUBSEQUENT BLINKING SIGNAL, LANE-CHANGE ASSISTANCE SYSTEM, AND VEHICLE

(71) Applicant: Bayerische Motoren Werke Aktiengesellschaft, Munich (DE)

(72) Inventor: Michael Gutbrod, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 140 days.

(21) Appl. No.: 18/560,129

(22) PCT Filed: May 5, 2022

(86) PCT No.: PCT/EP2022/062088
§ 371 (c)(1),
(2) Date: Nov. 10, 2023

(87) PCT Pub. No.: WO2022/238219
PCT Pub. Date: Nov. 17, 2022

(65) Prior Publication Data
US 2024/0239346 A1     Jul. 18, 2024

(30) Foreign Application Priority Data
May 11, 2021 (DE) .................... 10 2021 112 223.6

(51) Int. Cl.
*B60W 30/18*     (2012.01)

(52) U.S. Cl.
CPC ... *B60W 30/18163* (2013.01); *B60W 2520/10* (2013.01); *B60W 2540/215* (2020.02); *B60W 2552/10* (2020.02); *B60W 2556/40* (2020.02)

(58) Field of Classification Search
CPC ....... B60W 30/18163; B60W 2520/10; B60W 2540/215; B60W 2552/10;
(Continued)

(56) References Cited

U.S. PATENT DOCUMENTS

| 5,521,579 A | 5/1996 | Bernhard |
| 2018/0178715 A1 | 6/2018 | Fujii |

(Continued)

FOREIGN PATENT DOCUMENTS

| DE | 199 41 308 A1 | 3/2001 |
| DE | 10 2015 203 208 A1 | 8/2016 |

(Continued)

OTHER PUBLICATIONS

Fujii Shota, Dec. 26, 2016, English Machine Translation_DE10 2017/128201 A1 provided by Patent Translate by EPO and Google (Year: 2016).*

(Continued)

*Primary Examiner* — Ashley L Redhead, Jr.
(74) *Attorney, Agent, or Firm* — Crowell & Moring LLP

(57) ABSTRACT

Systems, methods, and apparatuses are provided for operating a lane-change assistance system of a vehicle. An operating input from a driver is registered at an operating element, which is assigned to travel direction indicators. A blinking signal is output using the travel direction indicators after the registration of the operating input. A lane-change maneuver is started after registration of the operating input. A subsequent blinking signal is output following the blinking signal if the output of the blinking signal has ended and if ending of the lane-change maneuver has not yet taken place. The subsequent blinking signal is output at most for a first period of time if a current speed of the vehicle falls below a predetermined limiting speed. The subsequent blinking signal is output at most for a second period of time if the current speed of the vehicle exceeds the predetermined limiting speed.

8 Claims, 3 Drawing Sheets

(58) Field of Classification Search
CPC .. B60W 2556/40; B60W 30/12; B60W 30/08; B60W 40/04; B60W 50/10; B60W 2540/20; B60Q 1/40; G08G 1/167
See application file for complete search history.

(56) References Cited

U.S. PATENT DOCUMENTS

2019/0347939 A1* 11/2019 Kim .................. G08G 1/166
2020/0130567 A1*  4/2020 Taniguchi ............. B60Q 1/343

FOREIGN PATENT DOCUMENTS

| DE | 102016216133 A1 * | 3/2018 | |
| DE | 102017128201 A1 * | 6/2018 | ............ B60Q 1/346 |
| DE | 102017216800 A1 * | 3/2019 | |

OTHER PUBLICATIONS

Resch Christoph et al., Aug. 29, 2016, English Machine Translation_ DE10 2016/216133 A1 provided by Patent Translate by EPO and Google (Year: 2016).*

Augst Alexander et al., Sep. 22, 2017, English Machine Translation_ DE10 2017/216800 A1 provided by Patent Translate by EPO and Google (Year: 2017).*

International Search Report (PCT/ISA/210) issued in PCT Application No. PCT/EP2022/062088 dated Aug. 25, 2022 with English translation (4 pages).

German-language Written Opinion (PCT/ISA/237) issued in PCT Application No. PCT/EP2022/062088 dated Aug. 25, 2022 with English translation (10 pages).

German-language Search Report issued in German Application No. 10 2021 112 223.6 dated Sep. 30, 2021 with partial English translation (13 pages).

* cited by examiner

METHOD FOR OPERATING A
LANE-CHANGE ASSISTANCE SYSTEM OF A
VEHICLE, WITH SPEED-DEPENDENT
DIFFERENTIATION OF A SUBSEQUENT
BLINKING SIGNAL, LANE-CHANGE
ASSISTANCE SYSTEM, AND VEHICLE

BACKGROUND AND SUMMARY

The present subject matter relates to a method for operating a lane-change assistance system of a vehicle. In addition, the present subject matter relates to a lane-change assistance system and a vehicle having such a lane-change assistance system.

In known lane-change assistance systems having automated or automatic lane-change function, the driver typically indicates a lane-change intention by way of a specific operating action. When such an operating action is detected, using the lane-change assistance system, the vehicle is maneuvered along a planned trajectory onto the adjacent lane or neighboring lane with automatic lateral guidance and generally also with automatic longitudinal guidance. In such lane-change assistance systems, the lane-change intention on the part of the driver is typically signaled by actuating a corresponding operating element, for example, a turn signal lever, to trigger travel direction indicators visible from outside the vehicle.

Such a turn signal lever generally has an idle position, which is assigned to the non-activated travel direction indicators. To activate the travel direction indicators, the driver can tilt or move the lever starting from the idle position—depending on the selected travel direction—in one of two possible directions. To activate the travel direction indicators, two different positions are provided per possible direction: a detent position, in which the corresponding travel direction indicators are permanently activated, without the turn signal lever being held by the driver, and a so-called one-touch blinking position, in which the corresponding travel direction indicators are activated, wherein the turn signal lever falls back into the idle position upon being released. It can also be provided that the operating element or the turn signal lever is only briefly tapped by the driver or is deflected for a short period of time into the one-touch blinking position. In this case, for example, a so-called one-touch blinking signal can then be output. The travel direction indicators can be activated in this case for a predetermined number of blinking cycles, for example, three blinking cycles.

The lane-change intention can be indicated by the driver here, for example, in that they move the turn signal lever into the detent position or into the one-touch blinking position. Furthermore, it can be provided that the operating element or the turn signal lever is only briefly tapped to indicate the lane-change intention. If a predetermined operating input assigned to the lane-change intention is detected, the lane-change to the desired neighboring lane can then be carried out in an automated manner using the lane-change assistant.

The case can result as a consequence of the actuation of the operating element or the turn signal lever that the blinking signal is already no longer output using the travel direction indicator before the automated lane-change maneuver has been ended. When, for example, an automated lane-change maneuver is carried out or ended without a blinking signal being output using the travel direction indicator, other road users can be made uncertain. Moreover, this can result in hazardous situations, since other road users are not notified of the lane-change.

To counter this problem, a so-called subsequent blinking signal is output following the blinking signal, which is output as a result of the operating input by the driver. This means that the travel direction indicator remains activated or is activated again when the automated lane-change maneuver has not yet ended.

In this context, DE 10 2016 216 133 A1 describes a lane-change assistance system for a motor vehicle. It is provided here, for example, that when a wheel of the vehicle has already passed over the lane boundary upon leaving a one-touch blinking position, the lane-change maneuver is continued and subsequent blinking is carried out via the lane-change assistance system. In this case, the turn signal can remain activated in spite of leaving the one-touch blinking position. Furthermore, the subsequent blinking can remain active until completion of the lane-change maneuver. The subsequent blinking in particular takes place for a predetermined period of time, wherein the subsequent blinking is automatically ended upon reaching the target position if the present period of time has not yet been reached.

It is the object of the present subject matter to disclose a solution for how automated lane-change maneuvers of the type mentioned at the outset can be carried out more safely. Moreover, a vehicle having a corresponding lane-change assistance system is to be provided.

This object is achieved according to the present subject matter by a method, by a lane-change assistance system, and by a vehicle having the features according to the independent claims. Advantageous refinements of the present subject matter are specified in the dependent claims.

A method according to the present subject matter is used for operating a lane-change assistance system of a vehicle. The method comprises registering an operating input from a driver at an operating element which is assigned to travel direction indicators of the vehicle. In addition, the method comprises outputting a blinking signal using the travel direction indicators after registering the operating input. In addition, the method comprises starting or initiating the lane-change maneuver after the operating input is registered and outputting a subsequent blinking signal following the blinking signal if the output of the blinking signal has ended and ending of the lane-change maneuver has not yet taken place. The subsequent blinking signal is output in this case at most for a first period of time if a current speed of the vehicle falls below a predetermined limiting speed. Furthermore, the subsequent blinking signal is output at most for a second period of time that is longer in comparison to the first period of time, if the current speed of the vehicle exceeds the predetermined limiting speed.

As already explained at the outset, in operation or for the activation of the lane-change assistance system, initially the operating input from the driver can be detected. This operating input is carried out by the driver at the operating element, in particular a turn signal lever. The operating input is predetermined in this case and assigned to the automated lane-change maneuver. The predetermined operating input can be selected so that the driver holds the operating element or the turn signal lever in the one-touch blinking position described at the outset. Alternatively or additionally, it can be provided that the predetermined operating action is actuated in that the driver briefly taps the operating element or the turn signal lever or moves it for a short period of time into the one-touch blinking position. It is provided in this case in particular that upon the short-term deflection of the turn signal lever into the one-touch blinking position, a one-touch blinking signal is output using the travel direction indicator. In this case, the travel direction indicator can be activated for a predetermined number of blinking cycles, for example three blinking cycles. The operating action can also be predetermined so that the driver moves the turn signal lever into the detent position.

When the driver thus holds the turn signal lever in the one-touch blinking position, the blinking signal is output using the travel direction indicator as long as the driver holds the turn signal lever in the one-touch blinking position. If the driver has actuated the one-touch blinking or has deflected the turn signal lever only briefly into the one-touch blinking position, a predetermined number of blinking cycles is output. Moreover, the blinking signal is output as long as the turn signal lever is located in the detent position.

After the registration of these predetermined operating actions, the automated lane-change maneuver is then also started or initiated. For this purpose, free spaces for the vehicle on the neighboring lane or the target lane can be searched for with the aid of corresponding distance sensors of the lane-change assistance system. If such a free space for the vehicle is then detected, the vehicle can be maneuvered using the lane-change assistance system in an at least semiautomated manner onto the neighboring lane or the target lane. In this case, the lane-change assistance system can engage in the steering of the vehicle or take over the lateral guidance. It is preferably also provided, however, that the longitudinal guidance of the vehicle is also taken over during the automated lane-change using the driver assistance system.

When the output of the blinking signal using the travel direction indicator has ended, but the automated lane-change maneuver has not yet been ended, the so-called subsequent blinking signal is output using the travel direction indicator. In this case, both during the blinking signal and also during the subsequent blinking signal, the travel direction indicators can be periodically activated or the travel direction indicators can light up cyclically. In other words, the subsequent blinking signal can correspond to the blinking signal. When the lane-change maneuver thus has not yet been ended, the travel direction indicator can still remain active or can be reactivated by the output of the subsequent blinking signal.

It is provided here according to the present subject matter that a period of time during which the subsequent blinking signal is output at most is selected as a function of the current speed of the vehicle. If the current speed of the vehicle falls below the predetermined limiting speed, the subsequent blinking signal can be output at most for the first period of time. If the current speed of the vehicle exceeds the predetermined limiting speed, however, the subsequent blinking signal can be output at most for the second period of time. The second period of time is longer than the first period of time here. In principle, the subsequent blinking signal is output at most until the lane-change maneuver has ended.

The present subject matter is based on the finding that an unrestricted output of the subsequent blinking signal, for example, for the second period of time, can result in problems in the functional safety. In particular at speeds below the limiting speed, other road users can assess or interpret the subsequent blinking signal incorrectly. Such a situation can result, for example, if an automated lane-change is carried out in the region of an intersection. In this case, the subsequent blinking signal can incorrectly be understood by other road users to mean that the vehicle which is carrying out or has carried out the lane-change wishes to turn off. Up to this point, this problem has been countered in that an availability of such subsequent-blinking systems has been restricted to a speed range above the limiting speed.

According to the present subject matter, a speed-dependent differentiation of the subsequent blinking behavior is provided. In particular, it is provided that below the limiting speed, a subsequent blinking signal is only available for a restricted period of time (first period of time) which meets the functional safety aspects. Above the limiting speed, however, an expanded or unrestricted subsequent blinking period (second period of time) can be enabled. Overall, the risk of accident during operation of the lane-change assistance system can thus be minimized.

The predetermined limiting speed is preferably in a range between 60 km/h and 80 km/h. In particular, the predetermined limiting speed can be 70 km/h. In other words, for reasons of functional safety, the subsequent blinking of the driver assistance system or the lane-change assistance system is not displayed unrestrictedly in the speed range below 70 km/h. Experiments have shown here that below this limiting speed, in particular below a speed of 70 km/h, other road users can incorrectly interpret or assess the subsequent blinking signal. In particular, other road users can understand the subsequent blinking signal below 70 km/h as a turning-off intention. If the subsequent blinking signal is only output for at most the first period of time below the limiting speed, the safety during the output of the subsequent blinking signal can be ensured.

In one example, the first period of time is between 1 second and 5 seconds, preferably between 3 seconds and 4 seconds. The first period of time is output maximally or at most until the automated lane-change maneuver has ended. The first period of time can be, for example, 3.2 seconds. It can also be provided that the first period of time is assigned to a predetermined number of blinking cycles. For example, the first period of time can be assigned to a period of time between four and six blinking cycles. In particular, the first period of time can be assigned to a period of time of five blinking cycles. Experiments have shown here that with a first period of time selected in this manner, the subsequent blinking signal cannot be incorrectly understood as a turning-off intention, for example.

In a further example, the second period of time is between 8 seconds and 12 seconds, preferably between 9 seconds and 10 seconds. Therefore, for example, on expressways or on freeways, a sufficiently long subsequent blinking time can be ensured in order to be able to enable an automatic lane-change maneuver even in heavy traffic.

Preferably, after the start of the lane-change maneuver, a neighboring lane is examined for a free space for the vehicle and if the free space is detected, the vehicle is maneuvered onto the neighboring lane. As soon as the predetermined operating action or the actuation of the turn signal lever is detected, the lane-change maneuver is started or initiated. It can initially be checked in this case onto which neighboring lane (left or right) the vehicle is to change. The neighboring lane, which can also be designated as the target lane, can be the directly adjacent lane or also, for example, the lane beyond the closest lane. To detect the free space for the vehicle, sensor data are received from the distance sensors of the lane-change assistance system. As soon as a free space is detected, the vehicle can then be maneuvered using the lane-change assistance system. The vehicle can in particular be maneuvered along a planned trajectory in this case. The lateral guidance of the vehicle, but preferably also the longitudinal guidance of the vehicle is taken over here by the lane-change assistance system.

In one example, the maneuvering of the vehicle onto the neighboring lane or the adjacent lane does not take place if the output of the subsequent blinking signal has ended. It can be the case in heavy traffic that the search for a free space for the vehicle on the neighboring lane occupies a comparatively long period of time. If this period of time exceeds the first or the second period of time (depending on the speed of the vehicle), the automatic lane-change maneuver may not be carried out. In this case, the subsequent blinking signal is also no longer output. An automatic lane-change maneuver carried out after the ending of the subsequent blinking signal could represent a safety risk here.

According to a further example, the maneuvering of the vehicle onto the neighboring lane is continued if ending of the duration of the maneuvering exceeds the duration during which the subsequent blinking signal is output. For example, if it is detected that the completion of the lane-change maneuver or the end of the maneuvering will only take place after the subsequent blinking signal is output, the lane-change maneuver can nonetheless be carried out. In this case, the vehicle is already located in carrying out the lane-change maneuver when the subsequent blinking signal is no longer output. In this case, the lane-change maneuver can be ended in consideration of the safety requirements.

Furthermore, it is advantageous if a selection of the first period of time or the second period of time for the subsequent blinking signal is checked for plausibility on the basis of digital map data. It can be provided in particular that the subsequent blinking signal is output for the second period of time when the vehicle is located on an expressway or freeway. In this case, the vehicle will typically move at a speed above the predetermined limiting speed. In contrast thereto, it is provided in particular that the subsequent blinking signal is output for the first period of time in inner-city traffic. The speed-dependent selection of the first period of time or the second period of time for the subsequent blinking signal can therefore be checked for plausibility on the basis of digital map data. These digital map data can describe the roadway on which the vehicle is currently located. In particular, the map data can describe a type of the roadway and/or a maximum permissible speed for the roadway. In this way, the output of the subsequent blinking signal can take place more reliably.

A lane-change assistance system according to the present subject matter is designed for carrying out a method according to the present subject matter and the advantageous examples thereof. The lane-change assistance system can include a computing unit, which can be formed by at least one electronic control unit, a processor, or the like. In addition, the lane-change assistance system can comprise distance sensors, for example, multiple radar sensors. Objects in the surroundings of the vehicle and in particular free spaces for the vehicle on a neighboring lane can be detected on the basis of sensor data of these distance sensors using the computing unit. Moreover, a trajectory for the maneuvering of the vehicle from the current lane onto the neighboring lane or the target lane can be computed using the computing unit. Moreover, the lane-change assistance system can be configured to register an operating action carried out on an operating element, in particular on a turn signal lever. In addition, the computing unit can be designed to output a control signal for activating steering or a steering system of the vehicle. The lateral guidance of the vehicle during the lane changing maneuver can then be taken over by the activation of the steering. It can also be provided that the longitudinal guidance of the vehicle during the lane-change maneuver is carried out using the lane-change assistance system.

A vehicle according to the present subject matter comprises a lane-change assistance system according to the present subject matter. The vehicle is designed in particular as a passenger vehicle.

The preferred examples presented with reference to the method according to the present subject matter and the advantages thereof apply accordingly for the lane-change assistance system according to the present subject matter and the vehicle according to the present subject matter.

Further features of the present subject matter result from the claims, the figures, and the description of the figures. The features and combinations of features mentioned above in the description, and the features and combinations of features mentioned hereinafter in the description of the figures and/or shown solely in the figures are usable not only in the respectively specified combination but also in other combinations or alone without departing from the scope of the present subject matter.

DETAILED DESCRIPTION OF THE DRAWINGS

In the figures, identical or functionally-identical elements are provided with identical reference signs.

Figure 1:
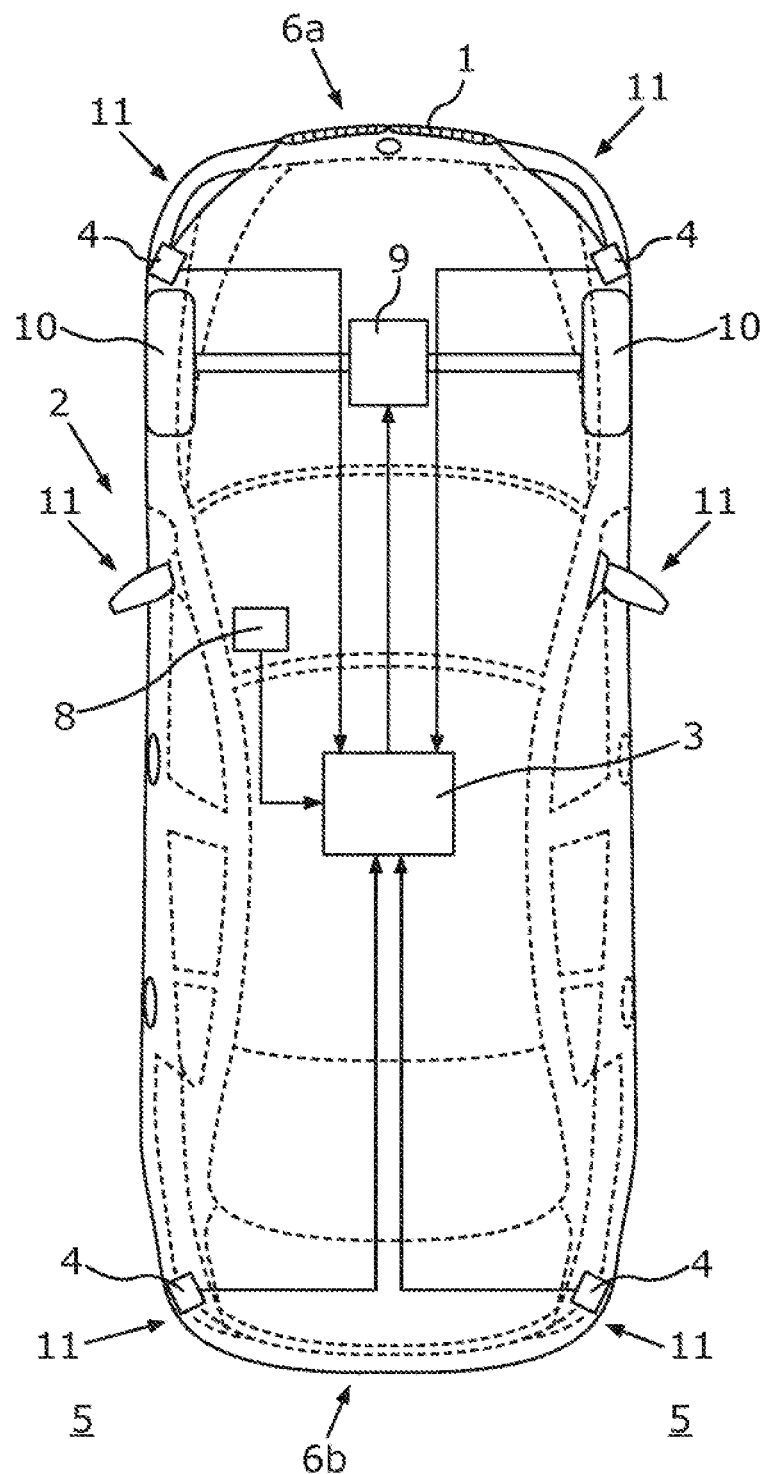
FIG. 1 shows a schematic representation of a vehicle which includes a lane-change assistance system for carrying out an automatic lane-change maneuver.

FIG. 1 shows a vehicle 1, which is designed in the present case as a passenger vehicle, in a top view. The vehicle 1 comprises a lane-change assistance system 2, by means of which automatic lane-change maneuvers can be carried out using the vehicle 1. The lane-change assistance system 2 comprises a computing unit 3, which can be formed, for example, by at least one electronic control unit of the vehicle 1.

In addition, the lane-change assistance system 2 comprises at least one distance sensor 4. In the present example, the lane-change assistance system 2 comprises four distance sensors 4, of which two distance sensors 4 are assigned to a front region 6a and two distance sensors 4 are assigned to a rear region 6b. The distance sensors 4 are arranged here in the respective corners of the vehicle 1. The distance sensors 4 can be designed, for example, as radar sensors. Corresponding measurements can be carried out using the distance sensors 4 in order to be able to detect objects 7 in the surroundings 5 of the vehicle 1.

The computing unit 3 is furthermore designed to register a predetermined operating action carried out by a driver on an operating element 8. The operating element 8 can be, for example, a turn signal lever. The predetermined operating action can be holding the operating element 8 or the turn signal lever in a so-called one-touch blinking position or briefly moving the operating element 8 into the one-touch blinking position.

As a result of the actuation of the operating element 8, travel direction indicators 11, which are only indicated in the present case, can be activated. A blinking signal can be output using these travel direction indicators 11 after actuation of the operating element 8. The blinking signal can be output here as long as the operating element 8 is held in the one-touch blinking position. If the operating element 8 was only tapped or was briefly deflected into the one-touch blinking position, the corresponding travel direction indicators 11 can be activated for a predetermined number of blinking cycles, for example, three blinking cycles.

When it is detected that the blinking signal has already been ended but the automatic lane-change maneuver has not yet been completed, in addition a subsequent blinking signal can be output using the travel direction indicators 11. Respective lighting elements of the travel direction indicators 11 can light up or blink periodically both in the blinking signal and also in the subsequent blinking signal.

In addition, the computing unit 3 is configured to activate a steering system 9 (only schematically shown in the present case) of the vehicle 1. Lateral guidance of the vehicle 1 during the lane-change maneuver can be carried out by the activation of the steering system 9. Steerable wheels 10 of the vehicle 1 can be steered by the activation of the steering system 9 and therefore the lateral guidance can be taken over during the lane-change maneuver.

Figure 2:
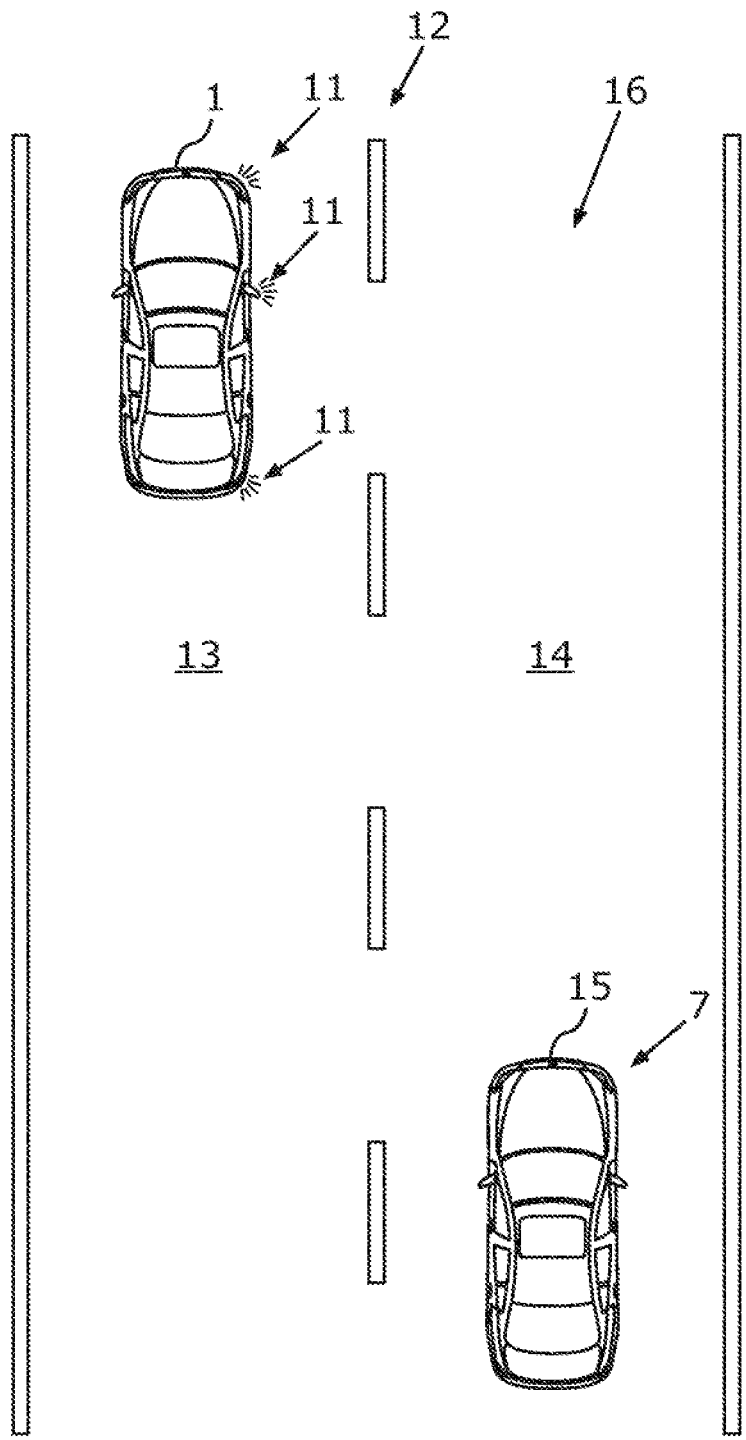
FIG. 2 shows the vehicle before carrying out a lane-change maneuver, wherein a current speed of the vehicle exceeds a predetermined limiting speed.

FIG. 2 shows the vehicle 1, which is located on a first roadway 12. The first roadway 12 can be assigned, for example, to a freeway or an expressway. The vehicle 1 is located here on a lane 13 of the roadway 12. The driver of the vehicle 1 wishes to carry out an automatic lane-change from the lane 13 to a neighboring lane 14 here. For this purpose—as described above—they actuate the operating element 8 or the turn signal lever. As a result of the actuation of the operating element 8, the travel direction indicators 11 on the right side of the vehicle 1 are activated or these travel direction indicators 11 blink. A free space 16 for the vehicle 1 on the neighboring lane 14 is detected in front of an object 7 or a further road user 15 using the distance sensors 4 of the lane-change assistance system 2. After the detection of the free space 16, the vehicle 1 is maneuvered using the lane-change assistance system 2 onto the neighboring lane 14.

Using the travel direction indicators 11, the subsequent blinking signal is output as long as the lane-change maneuver has not yet been ended and if the blinking signal was already ended. The subsequent blinking signal is output at most for a second period of time in this case. This second period of time can be up to 10 seconds, for example. The period of time during which the subsequent blinking signal is output using the travel direction indicators 11 is determined as a function of a current speed of the vehicle 1. In the example of FIG. 2, the vehicle 1 travels at a speed above a limiting speed, for example, 70 km/h.

Figure 3:
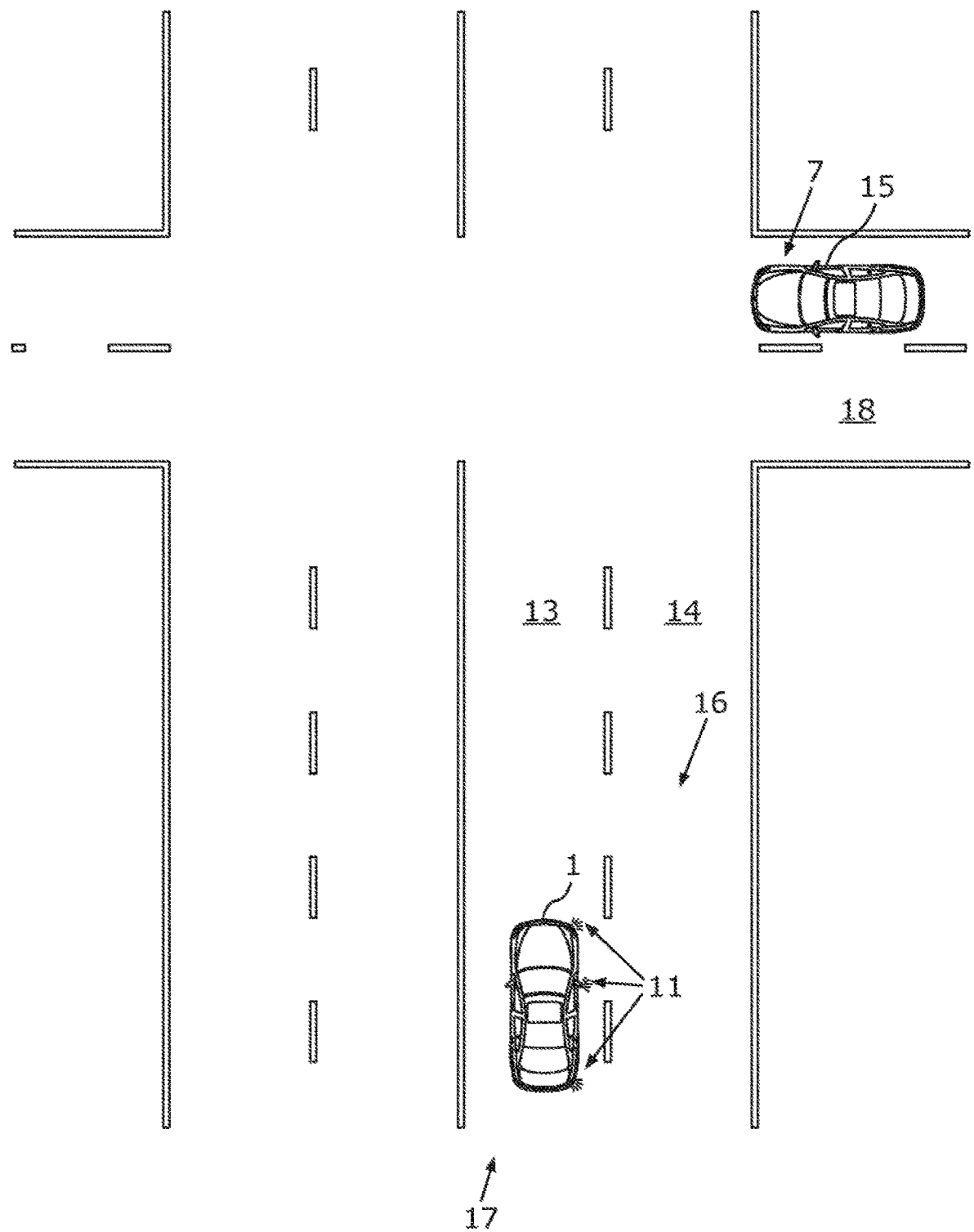
FIG. 3 shows the vehicle during a further lane-change maneuver, wherein a current speed of the vehicle falls below the predetermined limiting speed.

In comparison thereto, FIG. 3 shows a schematic representation of the vehicle 1 on a second roadway 17. This roadway 17 is assigned to a multilane road in the inner-city region. This roadway 17 also comprises a lane 13, on which the vehicle 1 is currently located, and a neighboring lane 14. The driver also wishes to carry out an automatic lane-change from the lane 13 to the neighboring lane 14 here and actuates the operating element 8 for this purpose. In this case, a current speed of the vehicle 1 is below the predetermined limiting speed, which can be 70 km/h, for example.

In this case, the subsequent blinking signal is output at most for the first period of time. The subsequent blinking signal is also output here if the blinking signal is no longer output and the lane-change maneuver has not yet ended. The first period of time can be, for example, between 3 seconds and 4 seconds. For example, the first period of time can be selected so that it corresponds to five blinking cycles of the subsequent blinking signal. In this case, the output of a subsequent blinking signal for the longer second period of time would possibly result in confusion of a further road user 15, who could assume that the vehicle 1 wishes to turn off into a further lane 18 due to the output of the subsequent blinking signal.

Due to the speed-dependent differentiation of the chronological duration of the subsequent blinking signal, the availability of subsequent-blinking systems can also be enabled for the speed range below the limiting speed. Moreover, the safety in the operation of the lane-change assistance system 2 can be improved.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The invention claimed is:

1. A method for operating a lane-change assistance system of a vehicle, comprising:
   registering an operating input from a driver at an operating element, which is assigned to travel direction indicators of the vehicle,
   outputting a blinking signal using the travel direction indicators after the registration of the operating input,
   starting a lane-change maneuver after the registration of the operating input, and
   outputting a subsequent blinking signal following the blinking signal if the output of the blinking signal has ended and if ending of the lane-change maneuver has not yet taken place, wherein
      the subsequent blinking signal is output at most for a first period of time if a current speed of the vehicle falls below a predetermined limiting speed, and
      the subsequent blinking signal is output at most for a second period of time longer than the first period of time if the current speed of the vehicle exceeds the predetermined limiting speed;
   further comprising:
   after the start of the lane-change maneuver, examining a neighboring lane for a free space for the vehicle, and if the free space is detected, the vehicle is maneuvered onto the neighboring lane, and
   wherein the maneuvering of the vehicle onto the neighboring lane does not take place if the output of the subsequent blinking signal has ended.

2. The method according to claim 1, wherein the predetermined limiting speed is in a range between 60 km/h and 80 km/h.

3. The method according to claim 1, wherein the first period of time is between 3 seconds and 4 seconds.

4. The method according to claim 1, wherein the second period of time is between 8 seconds and 12 seconds.

5. The method according to claim 1, wherein a selection of the first period of time or the second period of time for the subsequent blinking signal is checked for plausibility based on digital map data.

6. A lane-change assistance system for a vehicle, wherein the lane-change assistance system is configured to carry out the method of claim 1.

7. A passenger vehicle, comprising:
the lane-change assistance system according to claim 6.

8. A method for operating a lane-change assistance system of a vehicle, comprising:
registering an operating input from a driver at an operating element, which is assigned to travel direction indicators of the vehicle,
outputting a blinking signal using the travel direction indicators after the registration of the operating input,
starting a lane-change maneuver after the registration of the operating input, and
outputting a subsequent blinking signal following the blinking signal if the output of the blinking signal has ended and if ending of the lane-change maneuver has not yet taken place, wherein
the subsequent blinking signal is output at most for a first period of time if a current speed of the vehicle falls below a predetermined limiting speed,
the subsequent blinking signal is output at most for a second period of time longer than the first period of time if the current speed of the vehicle exceeds the predetermined limiting speed, and
further comprising:
after the start of the lane-change maneuver, examining a neighboring lane for a free space for the vehicle, and if the free space is detected, the vehicle is maneuvered onto the neighboring lane, wherein
the maneuvering of the vehicle onto the neighboring lane is continued if ending the maneuvering exceeds a duration during which the subsequent blinking signal is output.

* * * * *